US012014017B2

United States Patent
Kitamura et al.

(10) Patent No.: US 12,014,017 B2
(45) Date of Patent: Jun. 18, 2024

(54) TOUCH PANEL HAVING PATTERN SHAPE OF SENSOR ELECTRODE CLOSE TO PATTERN SHAPE OF LEAD-OUT WIRE

(71) Applicant: Japan Aviation Electronics Industry, Limited, Tokyo (JP)

(72) Inventors: Yuji Kitamura, Tokyo (JP); Makoto Danno, Tokyo (JP); Joji Akizuki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 17/766,695

(22) PCT Filed: Oct. 12, 2020

(86) PCT No.: PCT/JP2020/038456
§ 371 (c)(1),
(2) Date: Apr. 5, 2022

(87) PCT Pub. No.: WO2021/100354
PCT Pub. Date: May 27, 2021

(65) Prior Publication Data
US 2024/0028174 A1 Jan. 25, 2024

(30) Foreign Application Priority Data

Nov. 20, 2019 (JP) .................. 2019-209254

(51) Int. Cl.
*G06F 3/044* (2006.01)
*G06F 3/041* (2006.01)

(52) U.S. Cl.
CPC ........ *G06F 3/0448* (2019.05); *G06F 3/04164* (2019.05); *G06F 3/0443* (2019.05); *G06F 2203/04107* (2013.01)

(58) Field of Classification Search
CPC .. G06F 3/0448; G06F 3/04164; G06F 3/0443; G06F 2203/04107
See application file for complete search history.

(56) References Cited

U.S. PATENT DOCUMENTS 10,013,122 B2    7/2018   Kurasawa et al.
10,551,963 B2    2/2020   Sakamoto et al.
(Continued)

FOREIGN PATENT DOCUMENTS

CN    106155396 A    11/2016
CN    206339953 U     7/2017
(Continued)

OTHER PUBLICATIONS

European Search Report in EP 20891199.0-1224, dated Sep. 8, 2022.
(Continued)

*Primary Examiner* — Lisa S Landis
(74) *Attorney, Agent, or Firm* — Collard & Roe, P.C.

(57) ABSTRACT

In the present invention a detection unit of a touch panel has sensor electrodes and a plurality of lead-out wires connected to the sensor electrodes. Each lead-out wire is provided with a wiring main section. The sensor electrodes are provided with a plurality of electrode main sections and a plurality of connection sections. The wiring main sections and electrode main sections are formed by repeatedly arranging side by side, in a first direction, unit patterns having a prescribed shape. In a second direction two adjacent electrode main sections are connected to each other by at least one connection section. Connections sections which are near to each other in the second direction are in different positions in the first direction. In each electrode main section, when two or more connection sections are side by side in the first direction, three consecutive unit patterns are connected by no more than two connection sections, or are not connected (Continued)

to one electrode main section positioned adjacent thereto in the second direction.

10 Claims, 15 Drawing Sheets

(56) References Cited

U.S. PATENT DOCUMENTS

| | | | |
|---|---|---|---|
| 10,860,157 | B2 | 12/2020 | Tomooka |
| 2016/0092004 | A1 | 3/2016 | Yoshiki |
| 2017/0090652 | A1* | 3/2017 | Sato ................. G06F 3/044 |
| 2018/0188852 | A1* | 7/2018 | Choi ................. G06F 3/0446 |
| 2020/0192506 | A1 | 6/2020 | Ogura |

FOREIGN PATENT DOCUMENTS

| | | |
|---|---|---|
| CN | 108279813 A | 7/2018 |
| JP | 2010-286886 A | 12/2010 |
| JP | 2014-089585 A | 5/2014 |
| JP | 2015-106342 A | 6/2015 |
| JP | 2015-232818 A | 12/2015 |
| JP | 2016-126730 A | 7/2016 |
| JP | 2017-004289 A | 1/2017 |
| JP | 2017-068556 A | 4/2017 |
| JP | 2018-109993 A | 7/2018 |
| JP | 6406575 B2 | 10/2018 |
| JP | 2019-082798 A | 5/2019 |
| TW | 201546681 A | 12/2015 |
| TW | 201837678 A | 10/2018 |
| WO | 2019/009315 A1 | 1/2019 |
| WO | 2018/123974 A | 6/2019 |

OTHER PUBLICATIONS

Korean Office Action dated Feb. 16, 2023 in Korean Application No. 10-2022-7013022, with English translation.
European Office Action dated Apr. 5, 2023 in European Application No. 20 891 199.0.
International Search Report in PCT/JP2020/038456, mailed Nov. 10, 2020.
First Taiwanese Office Action in TW 109135485, issued Sep. 6, 2021, with English translation.
Second Taiwanese Office Action in TW 109135485, issued Dec. 17, 2021, with English translation.
Japanese Office Action dated Aug. 2, 2023 in Japanese Application No. 2019-209254, with machine English translation.
Communication pursuant to Article 94(3) EPC issued in European Application No. 20 891 199.0 dated Aug. 31, 2023.

* cited by examiner

TOUCH PANEL HAVING PATTERN SHAPE OF SENSOR ELECTRODE CLOSE TO PATTERN SHAPE OF LEAD-OUT WIRE

CROSS REFERENCE TO RELATED APPLICATIONS

This application is the National Stage of PCT/JP2020/038456 filed on Oct. 12, 2020, which claims priority under 35 U.S.C. § 119 of Japanese Application No. 2019-209254 filed on Nov. 20, 2019, the disclosure of which is incorporated by reference. The international application under PCT article 21(2) was not published in English.

TECHNICAL FIELD

This invention relates to a touch panel.

BACKGROUND ART

A touch panel has an electrode layer. The electrode layer includes a sensor electrode pattern portion and a wiring pattern portion. The sensor electrode pattern portion and the wiring pattern portion are separated from each other except for a connection portion at which the sensor electrode pattern portion and the wiring pattern portion are connected to each other. If there is a difference between a pattern shape in the sensor electrode pattern portion and a pattern shape in the wiring pattern portion, the difference causes a spot on the touch panel when viewed and deteriorates display quality of the touch panel. Patent Document 1 discloses a touch panel switch device which can suppress such display quality deterioration.

As shown in FIG. 22, the touch panel switch device 90 disclosed in Patent Document 1 is provided with reticulated sensor electrode pattern portions 92 and nonlinear wiring pattern portions 94. The wiring pattern portions 94 are formed to be just like parts of reticulations of the sensor electrode pattern portions 92.

PRIOR ART DOCUMENTS

Patent Document(s)

Patent Document 1: JP 2014-89585 A

SUMMARY OF INVENTION

Technical Problem

The touch panel disclosed in Patent Document 1 still has a relatively large difference between the pattern shape of the sensor electrode pattern portion and the pattern shape of the wiring pattern portion. Accordingly, it is required to further improve viewability of a touch panel.

It is an object of the present invention to provide a touch panel which can further improve viewability thereof.

Solution to Problem

Generally, it is expected that a sensor electrode pattern portion can have increased sensitivity by reducing resistance thereof. However, according to verification made by the inventors, decreasing the number of connections in a reticulated sensor electrode pattern portion in one of two directions which are perpendicular to each other increased resistance, but had only slight influence on sensitivity.

Then, the inventors of the present invention changed in thinking so as to not bring the pattern shape of the wiring pattern portion close to the pattern shape of the sensor electrode pattern portion but bring the pattern shape of the sensor electrode pattern portion close to the pattern shape of the wiring pattern portion. With this structure, the present invention improves viewability of a touch panel and suppresses deterioration of sensibility of the touch panel. In detail, the present invention provides a touch panel mentioned below as a means for solving the problem mentioned above.

One aspect of the present invention provides, as a first touch panel, a touch panel comprising a detection portion which has sensor electrodes and a plurality of lead-out wires connected to the sensor electrodes, wherein:

the lead-out wires are electrically separated from one another;

each of the lead-out wires comprises a wire main portion;

the sensor electrode comprises a plurality of electrode main portions and a plurality of connection portions;

each of the wire main portions and the electrode main portions is formed by repeatedly arranging unit patterns in a first direction, each of the unit patterns having a predetermined shape;

two of the electrode main portions which are adjacent to each other in a second direction perpendicular to the first direction are connected to each other by at least one of the connection portions;

the connection portions which are closest to each other in the second direction are located in different positions in the first direction; and when two or more of the connection portions are arranged in the first direction in each of the electrode main portions, three of the unit patterns which are continuous are connected, by two or less of the connection portions, or not connected to one of the electrode main portions which is adjacent to them in the second direction.

Advantageous Effects of Invention

According to the present invention, since a pattern shape of the sensor electrode is brought close to a pattern shape of the lead-out wire, deterioration of sensitivity of the sensor electrode can be suppressed while the sensor electrode can be prevented from becoming conspicuous so that viewability of the touch panel can be improved.

An appreciation of the objectives of the present invention and a more complete understanding of its structure may be had by studying the following description of the preferred embodiment and by referring to the accompanying drawings.

BRIEF DESCRIPTION OF DRAWINGS

FIG. 3 is different from FIG. 2 in a point that the number of the lead-out wires is two.

DESCRIPTION OF EMBODIMENTS

Figure 1:
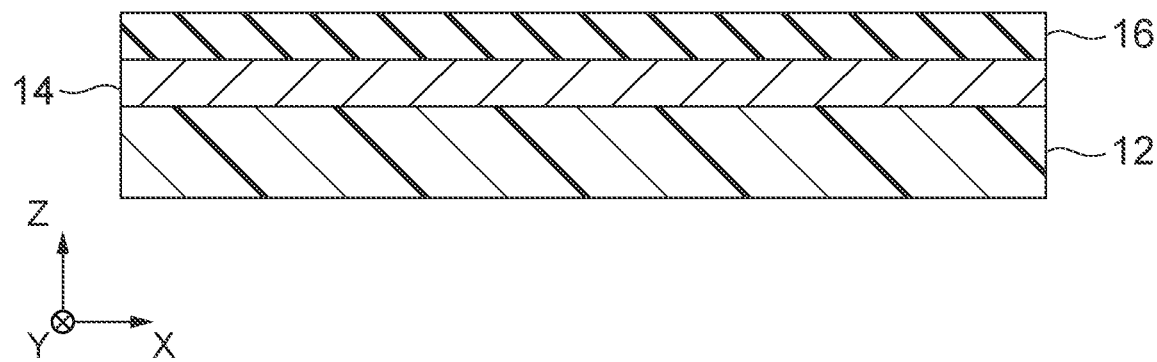
FIG. 1 is a cross-sectional view showing a schematic structure of a touch panel according to an embodiment of the present invention.

While the invention is susceptible of various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Referring to FIG. 1, a touch panel 10 according to an embodiment of the present invention is provided with a base member 12, an electrode layer 14 and a protective layer 16. The electrode layer 14 has a conductive pattern formed on a surface of the base member 12. The protective layer 16 is provided on the surface of the base member 12 so as to cover the electrode layer 14.

In the touch panel 10 of FIG. 1, the base member 12 is a board-like or film-like member. The base member 12 is made of a light-transmissive material such as glass or resin. The conductive pattern included in the electrode layer 14 may be printed and formed on the surface of the base member 12 by using electrically conductive ink. Alternatively, the conductive pattern included in the electrode layer 14 may be formed by etching a conductive film which is formed on the surface of the base member 12 by any method such as vacuum deposition. The protective layer 16 may be formed by spin coating or printing by using ink-like resin. Alternatively, the protective layer 16 may be formed by sticking a cover member made of glass or resin with adhesive.

Figure 2:
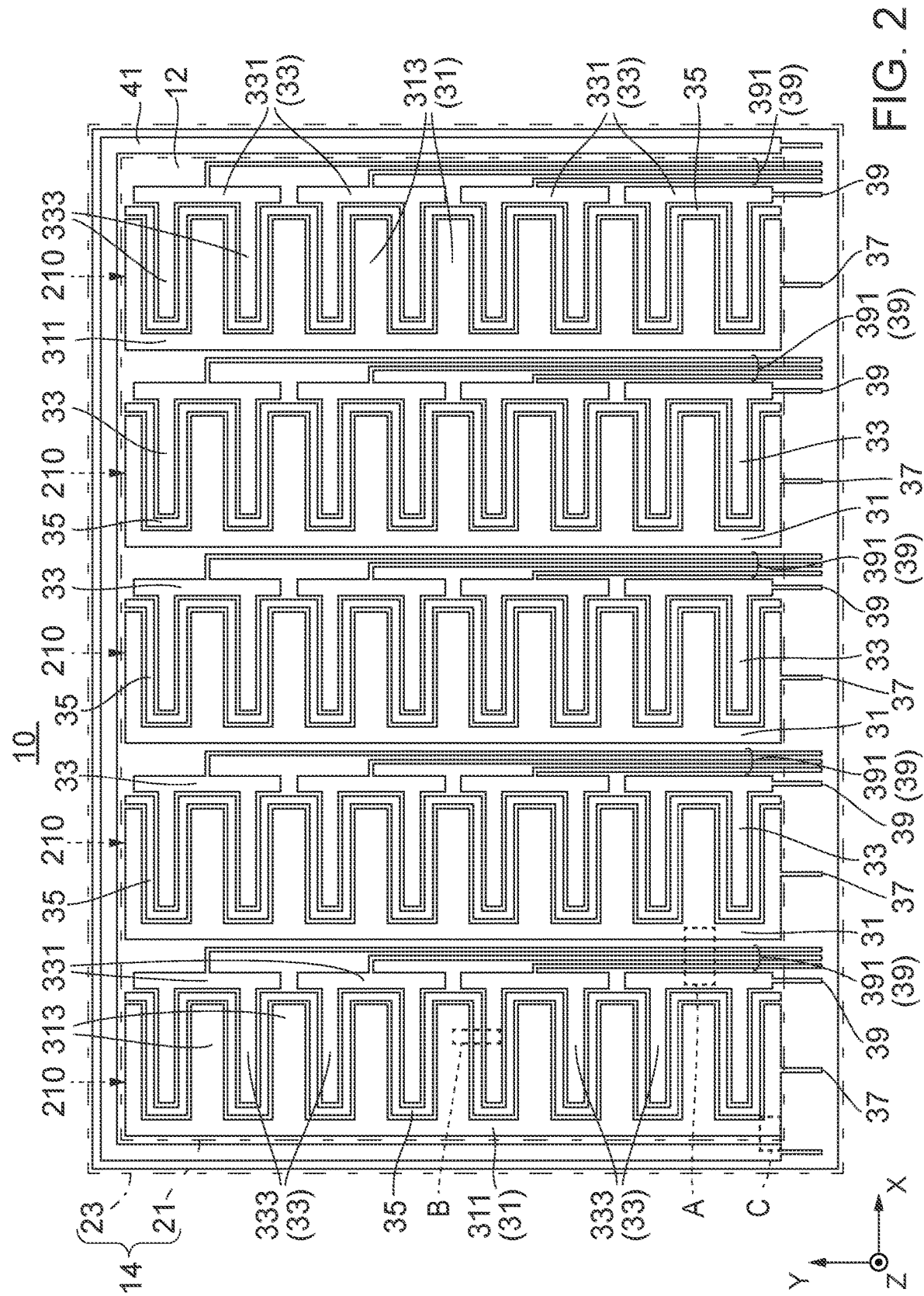
FIG. 2 is a plan view showing the touch panel of FIG. 1. A protective layer is omitted. First electrodes, second electrodes, dummy electrodes, lead-out wires, an outer ground electrode, and a frame wiring line which are included in an electrode layer are simplified, and their schematic arrangement is shown. A part of each of the dummy electrodes which is located between the first electrode corresponding thereto and the second electrode corresponding thereto is shown, and other parts of the dummy electrode are omitted.

Referring to FIG. 2, the electrode layer 14 has a detection portion 21 and a peripheral portion 23. The peripheral portion 23 surrounds the detection portion 21. In the detection portion 21, a plurality of first electrodes 31, a plurality of second electrodes (sensor electrodes) 33 and a plurality of dummy electrodes 35 are arranged. To the first electrodes 31, first lead-out wires 37 are connected, respectively. The first lead-out wires 37 are arranged in the peripheral portion 23. To the second electrodes 33, second lead-out wires (lead-out wires) 39 are connected, respectively. The second lead-out wires 39 are arranged from the detection portion 21 to the peripheral portion 23. In the peripheral portion 23, an outer peripheral ground wire 41 is further arranged. The outer peripheral ground wire 41 is provided around the detection portion 21.

As shown in FIG. 2, each of the first electrodes 31 and the second electrodes 33 is formed in a comb shape. In detail, each of the first electrodes 31 has a first main portion 311 and a plurality of first facing portions 313. The first main portion 311 extends along a first direction. The first facing portions 313 extend from the first main portion 311 along a second direction perpendicular to the first direction. Moreover, each of the second electrodes 33 has a second main portion 331 and at least one second facing portion 333. The second main portion 331 extends along the first direction. The second facing portions 333 extend from the second main portion 331 along the second direction. In the present embodiment, the first direction is a Y-direction, and the second direction is an X-direction. The first facing portions 313 extend from the first main portion 311 in a positive X-direction, and the second facing portions 333 extend from the second main portion 331 in a negative x-direction.

As understood from FIG. 2, the first electrodes 31 and the second electrodes 33 form a plurality of detection rows 210. In the present embodiment, the number of the detection rows 210 is five. The detection rows 210 are arranged in the second direction. Each of the detection rows 210 is formed with one of the first electrodes 31 and four of the second electrodes 33. In each of the detection rows 210, the second electrodes 33 are arranged along the first direction. However, the present invention is not limited thereto. The number and the arrangement of the detection rows 210 may be freely set. Moreover, in each of the detection rows 210, the number of the first electrodes 31 and the number of the second electrodes 33 may be freely set.

As understood from FIG. 2, in each of the detection rows 210, the first facing portions 313 and the second facing portions 333 are alternately arranged in the first direction. The first facing portion 313 and the second facing portion 333 which are next to each other in the first direction are apart from each other and face each other to form a capacitor. As understood from this, the touch panel 10 of the present embodiment is a mutual capacitance touch panel. The touch panel 10 of the present embodiment is provided with, as mentioned above, the detection portion 21 which has the sensor electrodes 33 and the lead-out wires 39 connected to the sensor electrodes 33.

As shown in FIG. 2, each of the first lead-out wires 37 is laid from the first electrode 31 corresponding thereto in a negative Y-direction. Moreover, each of the second lead-out wires 39 extends from the second electrode 33 corresponding thereto in the negative Y-direction directly or after extending in the positive X-direction. The first lead-out wires 37 and the second lead-out wires 39 are electrically separated from one another. The first lead-out wires 37 and the second lead-out wires 39 have a common pattern shape. In other words, the first lead-out wire 37 has a structure similar to that of the second lead-out wire 39 described later with reference to FIG. 3. However, this may not apply to the peripheral portion 23. In the peripheral portion 23, each of the first lead-out wires 37 and the second lead-out wires 39 is not necessary to have the pattern shape but may be formed as a simple linear wiring line, for example.

As shown in FIG. 2, some of the second lead-out wires 39 have elongation portions 391 arranged in the detection portion 21 and extending along the first direction. In the present embodiment, three of four second lead-out wires 39 corresponding to each of the detection rows 210 have the elongation portions 391. These three elongation portions 391 are arranged at predetermined intervals in the second direction.

Figure 3:
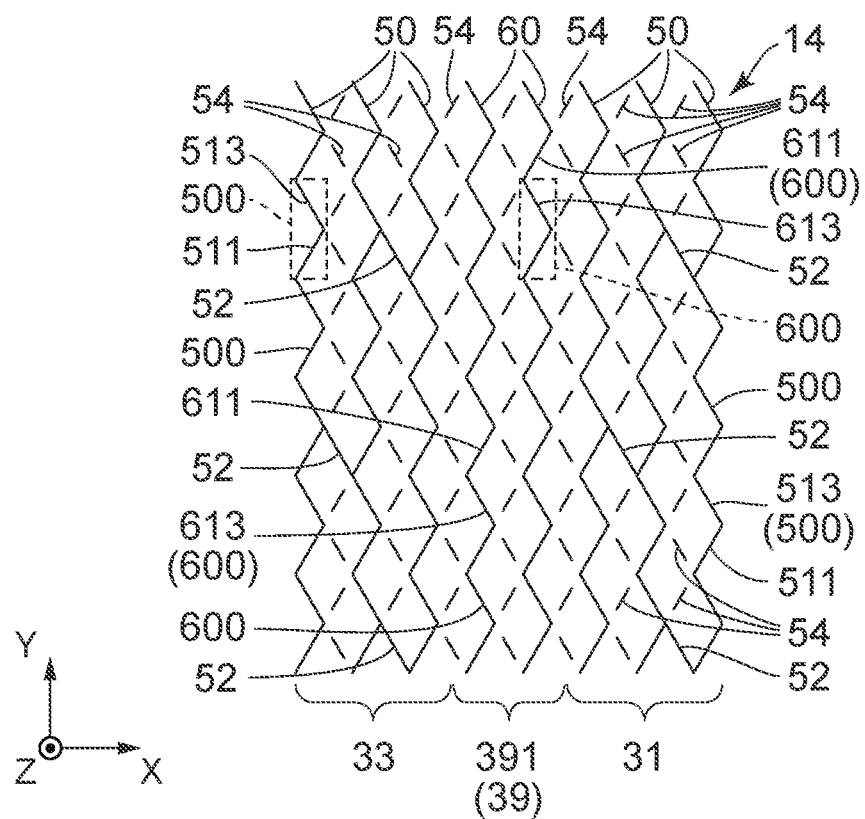
FIG. 3 is a diagram showing an example of a conductive pattern in an area surrounded by a broken line A of the touch panel of FIG. 2. The conductive pattern corresponds to a part of the first electrode, a part of the second electrode, and parts of the lead-out wires. In addition, the conductive pattern includes a plurality of short patterns. Additionally.

Referring to FIG. 3, each of the first electrodes 31 and the second electrodes 33 has a plurality of electrode main portions 50. Moreover, each of the second lead-out wires 39 has a wire main portion 60. Thus, in the present embodiment, the sensor electrode 33 has the plurality of the electrode main portions 50, and the lead-out wires 39 have a plurality of the wire main portions 60. The electrode main portions 50 and the wire main portions 60 have a common pattern shape. The electrode main portions 50 and the wire main portions 60 are arranged at regular intervals in the second direction.

As shown in FIG. 3, each of the electrode main portions 50 is formed by repeatedly arranging, in the first direction, unit patterns 500 each of which has a predetermined shape. In each of the electrode main portions 50, the unit patterns 500 are continuous. In the present embodiment, each of the electrode main portions 50 has a zigzag shape. Similarly, each of the wire main portions 60 is formed by repeatedly arranging, in the first direction, unit patterns 600 each of which has a predetermined shape. Also, in each of the wire main portions 60, the unit patterns 600 are continuous. In the present embodiment, each of the wire main portions 60 has a zigzag shape. Note that, in each of the first electrodes 31, the second electrodes 33 and the second lead-out wires 39, the number of repetitions of the unit patterns 500 or 600 depends on a size of an area where each of the first electrodes 31, the second electrodes 33 and the second lead-out wires 39 is formed. Accordingly, the number of the repetitions is not always an integer.

As shown in FIG. 3, the unit pattern 500 consists of a first portion 511 and a second portion 513. The first portion 511 extends in a first diagonal direction intersecting with both of the first direction and the second direction. The second portion 513 extends from one end of the first portion 511 in a second diagonal direction intersecting with all of the first direction, the second direction and the first diagonal direction. In the present embodiment, the first diagonal direction is the positive X-direction and a positive Y-direction, and the second diagonal direction is the negative X-direction and the positive Y-direction. However, the present invention is not limited thereto. The first portion 511 may extend in the second diagonal direction, and the second portion 513 may extend in the first diagonal direction.

As understood from FIG. 3, the unit pattern 600 has the same shape and the same size as those of the unit pattern 500. In detail, the unit patterns 600 consists of a first portion 611 and a second portion 613. The first portion 611 extends in the first diagonal direction, and the second portion 613 extends from one end of the first portion 611 in the second diagonal direction. However, the present invention is not limited thereto. The first portion 611 may extend in the second diagonal direction, and the second portion 613 may extend in the first diagonal direction.

As shown in FIG. 3, each of the first electrodes 31 and the second electrodes 33 further has a plurality of connection portions 52. Thus, in the touch panel 10 of the present embodiment, the sensor electrode 33 has the plurality of the connection portions 52. Each of the connection portions 52 connects the electrode main portions 50 which are next to each other in the second direction. In other words, two of the electrode main portions 50 which are next to each other in the second direction are connected to each other with at least one of the connection portions 52.

As shown in FIG. 3, each of the connection portions 52 extends in the first diagonal direction or the second diagonal direction. Each of the connection portions 52 connects two of the first portions 511 which are next to each other in the first diagonal direction to each other or two of the second portions 513 which are adjacent to each other in the second diagonal direction to each other. In other words, each of the connection portions 52 is as an extension line of the first portions 511 to be connected to each other or the second portions 513 to be connected to each other.

As understood from FIG. 3, in each of the first electrode 31 and the second electrode 33, the number of the connection portions 52 is smaller than the number of the unit patterns 500. This is because of bringing a pattern shape of each of the first electrode 31 and the second electrode 33 close to a pattern shape of the second lead-out wire 39.

When two or more of the connection portions 52 connected to each of the electrode main portions 50 are arranged in the first direction as shown in FIG. 3, the connection portions 52 closest to each other are apart from each other by a distance corresponding to two of the unit patterns 500 or over. In the present embodiment, the connection portions 52 closest to each other are apart from each other in the first direction by a distance corresponding to 3.5 times of the unit pattern 500. In other words, the connection portions 52 closest to each other are located to be different in position from each other in the first direction by four times of the unit pattern 500.

As understood from FIG. 3, the connection portions 52 closest to each other in the second direction are not located in the same position in the first direction. In other words, the connection portions 52 closest to each other in the second direction are located in different positions in the first direction. This is because the connection portions 52 becomes more likely to be visually conspicuous when the connection portions 52 closes to each other in the second direction are located in the same position in the first direction. In the present embodiment, the connection portions 52 closest to each other in both of the first direction and the second direction are different in position from each other in the first direction by two times of the unit pattern 500.

As shown in FIG. 3, the electrode layer 14 further has a plurality of short patterns 54. Each of the short patterns 54 is disposed between the electrode main portions 50 next to each other in the second direction in the second direction, between the electrode main portion 50 and the wire main portion 60 which are next to each other in the second direction, or between the wire main portions 60 next to each other in the second direction.

As shown in FIG. 3, each of the short patterns 54 extends in the first diagonal direction or the second diagonal direction. Each of the short patterns 54 is laid on an extension line of the first portion 511 or 611 or the second portion 513 or 613. Each of the short patterns 54 is separated from the first electrodes 31, the second electrodes 33 and the second lead-out wires 39. In other words, each of the short patterns 54 is electrically independent of the electrode main portions 50, the wire main portions 60 and the connection portions 52. The short patterns 54 are not always necessary. However, existence of the short patterns 54 allows a pattern formed by the electrode main portions 50 and the wire main portion 60 to become inconspicuous and allows existence of the connection portions 52 to become inconspicuous.

As understood from FIG. 3, in the present embodiment, the wire main portions 60, the electrode main portions 50, the connection portions 52 and the short patterns 54 have wiring widths which are equal to one another. This is because of preventing any of the wire main portions 60, the electrode main portions 50, the connection portions 52 and the short patterns 54 from being visually conspicuous. However, the present invention is not limited thereto. The wiring widths of the wire main portions 60, the electrode main portions 50, the connection portions 52 and the short patterns 54 may be different from one another, provided that they are within a visually acceptable range.

As understood from FIG. 3, a conductive pattern corresponding to each of the first electrodes 31 of the present embodiment and the second electrodes 33 of the present embodiment forms incomplete reticulation. Accordingly, in an area where the conductive pattern corresponding to each of the first electrodes 31 and the second electrodes 33 is formed, an occupying ratio of the conductive pattern is smaller in comparison with a case of a complete reticulated conductive pattern. In other words, the occupying ratio of the conductive pattern in the area where each of the first electrodes 31 and the second electrodes 33 is close to an occupying ratio of a conductive pattern in an area where the second lead-out wires 39 are formed. Accordingly, the first electrodes 31 and the second electrodes 33 are not remarkably conspicuous in comparison with the second lead-out wires 39. In addition, sensitivity of the touch panel 10 hardly decreases in comparison with a case of employing the complete reticulated conductive pattern. Thus, the touch panel 10 of the present embodiment can suppress deterioration of the sensibility thereof and improve viewability thereof.

Figure 4:
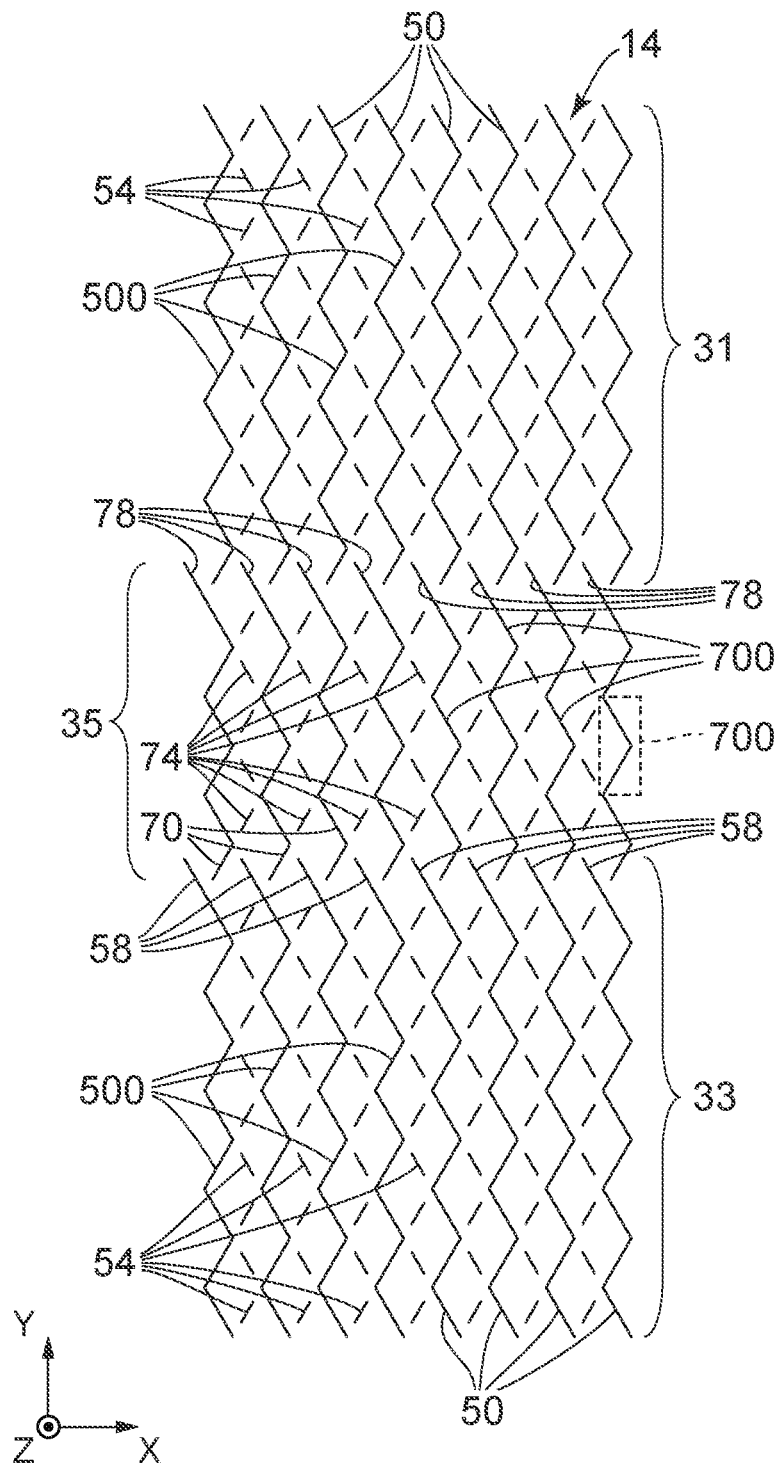
FIG. 4 is a diagram showing an example of a conductive pattern in an area surrounded by a broken line B of the touch panel of FIG. 2. The conductive pattern includes a part of the first electrode, a part of the second electrode, and a part of the dummy electrode. In each of the first electrode and the second electrode, connection portions are omitted.

As shown in FIG. 4, in the present embodiment, the dummy electrode 35 is provided with at least one dummy electrode main portion 70. In the present embodiment, the dummy electrode 35 is provided with a plurality of dummy electrode main portions 70. The dummy electrode main portions 70 are arranged at regular intervals in the second direction. Each of the dummy electrode main portions 70 is formed with the unit dummy patterns 700 each of which has the same shape as that of the unit patterns 500 of the first electrodes 31 and the second electrodes 33. In the present embodiment, each of the dummy electrode main portions 70 is formed by repeatedly arranging the unit dummy patterns 700 in the first direction. In each of the dummy electrode main portions 70, the unit dummy patterns 700 are continuous. The number of the dummy electrode main portions 70 and the number of repetitions of the unit dummy patterns 700 depend on a size of an area where the dummy electrode 35 is formed.

As understood from FIG. 4, the dummy electrode 35 is electrically separated from the first electrode 31 and the second electrode 33. In the present embodiment, an end of the second electrode 33 is provided with extension portions 58. Moreover, an end of the dummy electrode 35 is provided with the extension portions 78. Each of the extension portions 58 and 78 extends in the second diagonal direction. Owing to existence of the extension portions 58, the area where the dummy electrode 35 is disposed and the area where the second electrode 33 is disposed overlap with each other in the first direction. Moreover, owing to existence of the extension portions 78, the area where the first electrode 31 is disposed and the area where the dummy electrode 35 is disposed overlap with each other in the first direction. With this structure, a border between two electrodes next to each other can be inconspicuous. However, the present invention is not limited thereto. Instead of providing the extension portions 78, other extension portions (not shown)

extending in the opposite direction of the first diagonal direction may be provided at the end portion of the first electrode 31.

Figure 5:
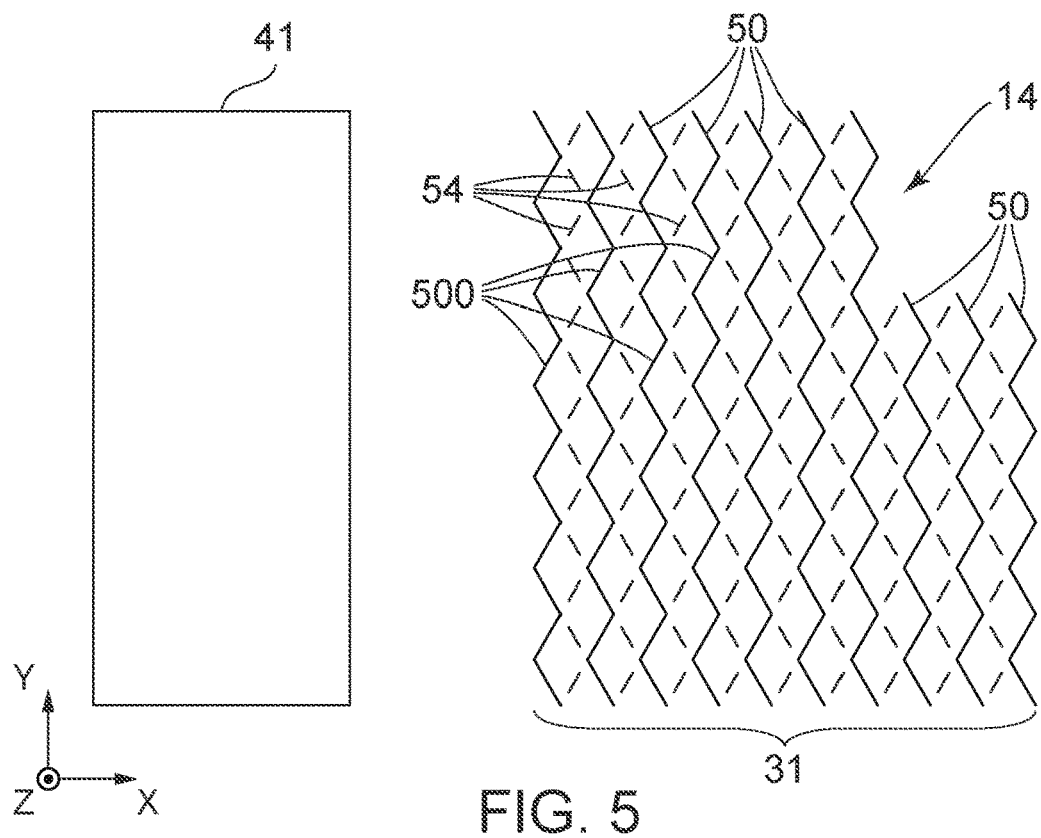
FIG. 5 is a diagram showing an example of a conductive pattern in an area surrounded by a broken line C of the touch panel of FIG. 2. The conductive pattern includes a part of the outer peripheral ground wire and a part of the first electrode. In the first electrode, connection portions are omitted.

As shown in FIG. 5, in the present embodiment, the outer peripheral ground wire 41 is formed as what is called a solid-pattern wire. A space is provided between the outer peripheral ground wire 41 and the first electrode 31, and the outer peripheral ground wire 41 and the first electrode 31 are electrically separated from each other.

As mentioned above, in the present embodiment, each of the first electrodes 31 and the second electrodes 33 is provided with the plurality of the electrode main portions 50. Each of the electrode main portions 50 is formed by repeatedly arranging the unit patterns 500 in the first direction, wherein each of the unit patterns 500 has the same shape as that of the unit dummy pattern 700 of the second lead-out wire 39. The electrode main portions 50 next to each other in the second direction are connected by at least one of the connection portions 52. In each of the electrode main portions 50, three of the unit patterns 500 which are continuous are connected, by two or less of the connection portions 52, or not connected to one of the electrode main portions 50 which is next thereto in the second direction. This structure can further suppress the first electrodes 31 and the second electrodes 33 from being conspicuous in comparison with the second lead-out wires 39. As a result, the viewability of the touch panel 10 is improved.

Although the specific explanation about the present invention is made above referring to the embodiments, the present invention is not limited thereto but susceptible of various modifications. Hereinafter, some modifications will be described.

Figure 6:
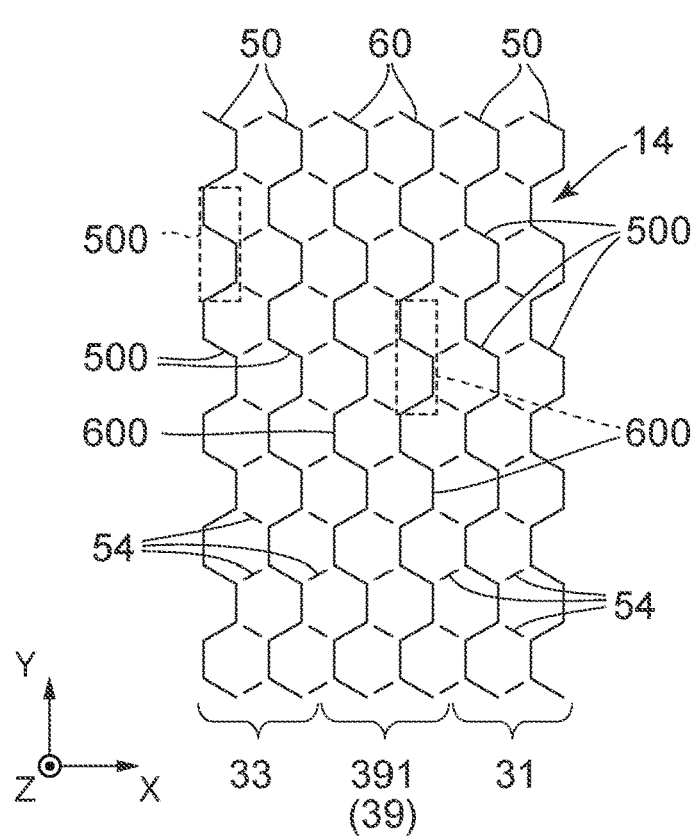
FIG. 6 is a diagram showing a first modification of the conductive pattern of FIG. 3. In each of the first electrode and the second electrode, connection portions are omitted.
Figure 7:
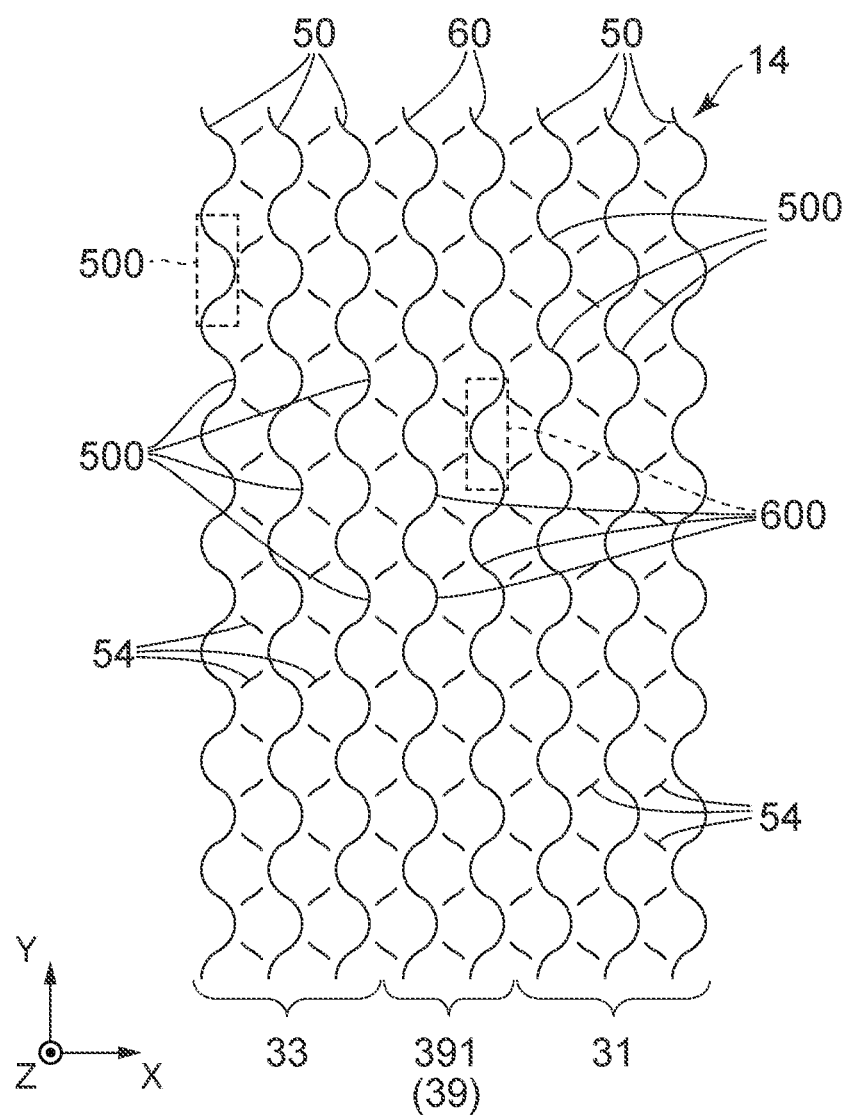
FIG. 7 is a diagram showing a second modification of the conductive pattern of FIG. 3. In each of the first electrode and the second electrode, connection portions are omitted.

As shown in FIG. 6, each of the unit patterns 500 and 600 may consist of four straight lines, for example. Alternatively, as shown in FIG. 7, each of the unit patterns 500 and 600 may consist of a combination of wave-shape lines.

Figure 8:
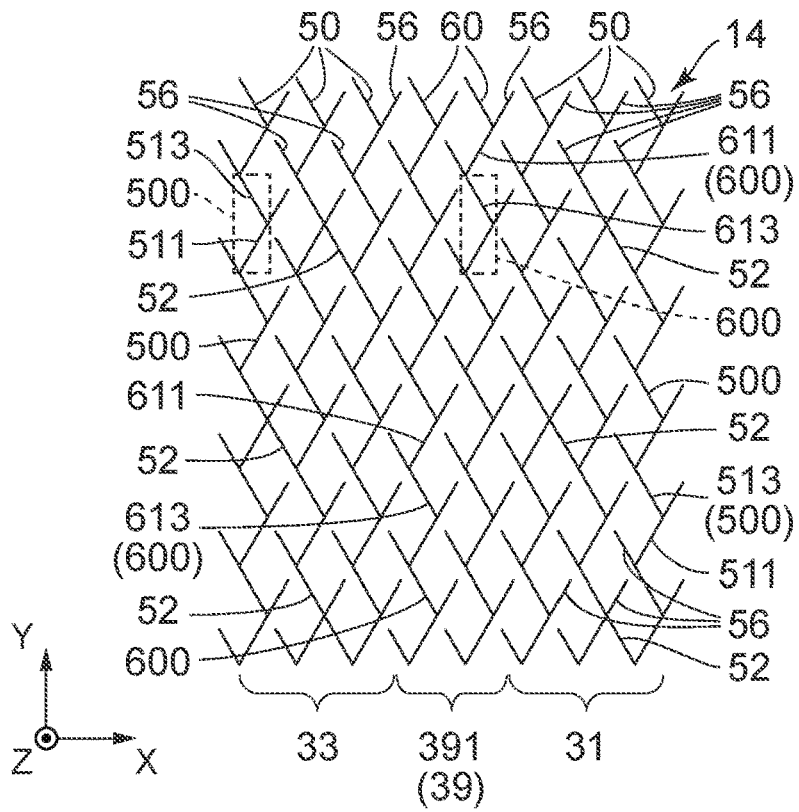
FIG. 8 is a diagram showing a third modification of the conductive pattern of FIG. 3. The conductive pattern includes a plurality of branch portions.

As shown in FIG. 8, the electrode layer 14 may have branch portions 56 in place of the short patterns 54. In other words, each of the electrode main portions and the wire main portions 60 may be further provided with a plurality of branch portions 56.

As shown in FIG. 8, each of the branch portions 56 extends in the first diagonal direction or the second diagonal direction. Each of the branch portions 56 extends from the first portion 511 of the unit pattern 500, the second portion 513 of the unit pattern 500, the first portion 611 of the unit pattern 600 or the second portion 613 of the unit pattern 600. A wiring width of the branch portion 56 is equal to that of the electrode main portion 50 and to that of the wire main portion 60. One end of each of the branch portions 56 is apart from the electrode main portions 50, the wire main portions 60 and the connection portions 52. The branch portions 56 allow the connection portions 52 to be more inconspicuous than the short patterns 54 do. On the other hand, the branch portion 56 needs an occupied area wider than that of the short pattern 54. It may be determined according to various conditions, such as sizes, shapes and an arrangement of the unit patterns 500 and 600, to use either the short patterns 54 or the branch portions 56.

Figure 9:
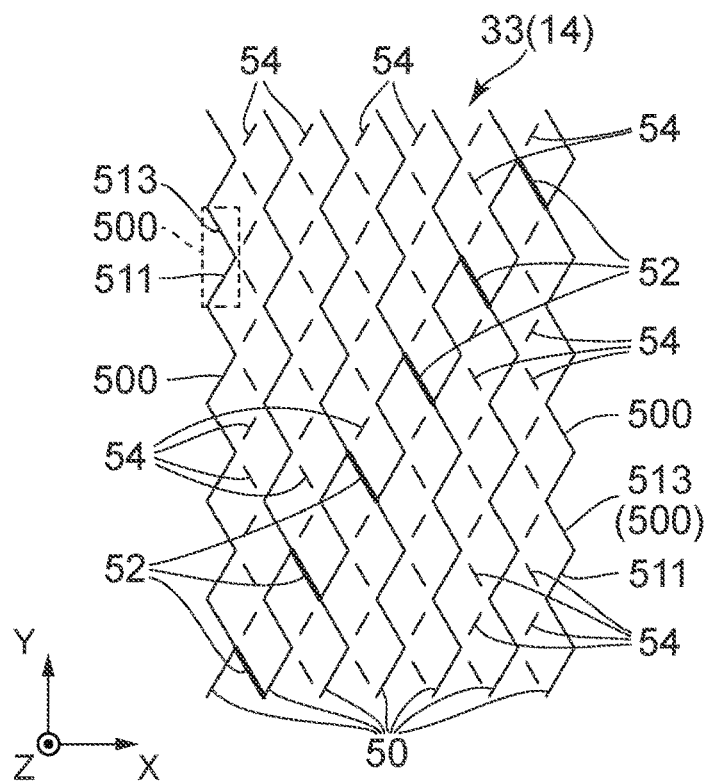
FIG. 9 is a diagram showing a first modification of an arrangement of connection portions in the first electrode or the second electrode which are included in the conductive pattern of FIG. 3. The connection portions are emphasized.
Figure 15:
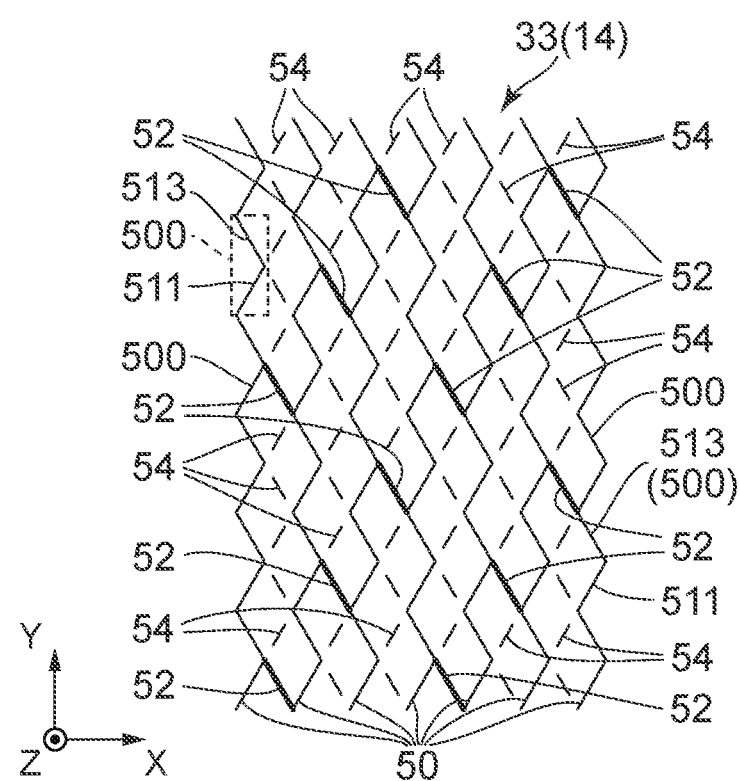
FIG. 15 is a diagram showing a seventh modification of the arrangement of the connection portions in the first electrode or the second electrode which are included in the conductive pattern of FIG. 3. The connection portions are emphasized.

As shown in FIGS. 9 and 15, an arrangement of the connection portions 52 in each of the first electrodes 31 and the second electrodes 33 may be variously changed.

Referring to FIG. 9, connection portions 52 are arranged so that only one of them is provided between the electrode main portions 50 adjacent to each other. The connection portions 52 closest to each other in the second direction are different in position from each other in the first direction by a distance corresponding to one of the unit patterns 500.

Figure 10:
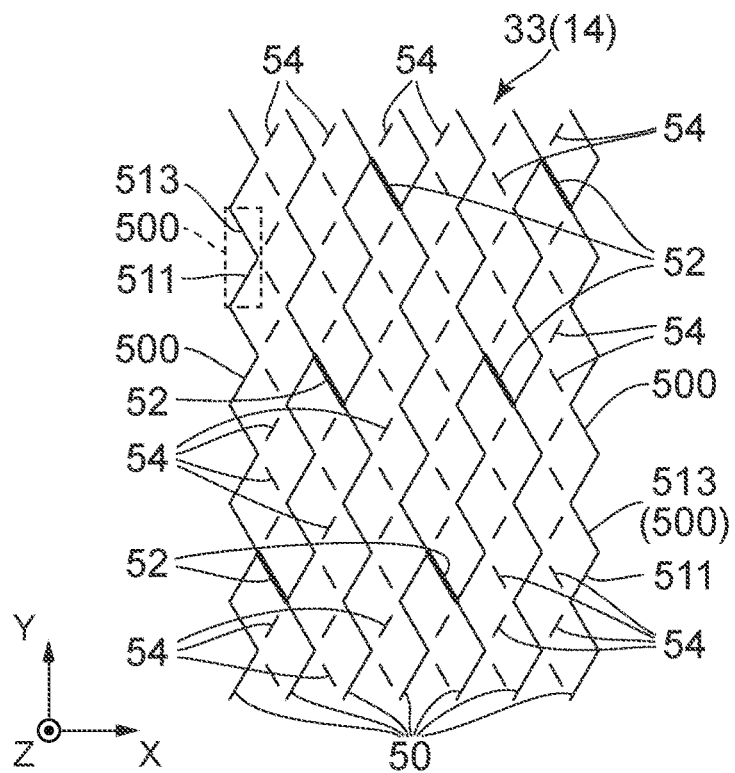
FIG. 10 is a diagram showing a second modification of the arrangement of the connection portions in the first electrode or the second electrode which are included in the conductive pattern of FIG. 3. The connection portions are emphasized.

Referring to FIG. 10, connection portions 52 are arranged so that only one of them is provided between the electrode main portions 50 adjacent to each other. Every three of the connection portions 52 forms a group. In FIG. 10, two gropes of the connection portions 52 are shown. The two gropes are different in position from each other in the second direction. In each of the gropes, the connection portions 52 closest to each other in the second direction are different in position from each other in the first direction by a distance corresponding to two of the unit patterns 500.

Figure 11:
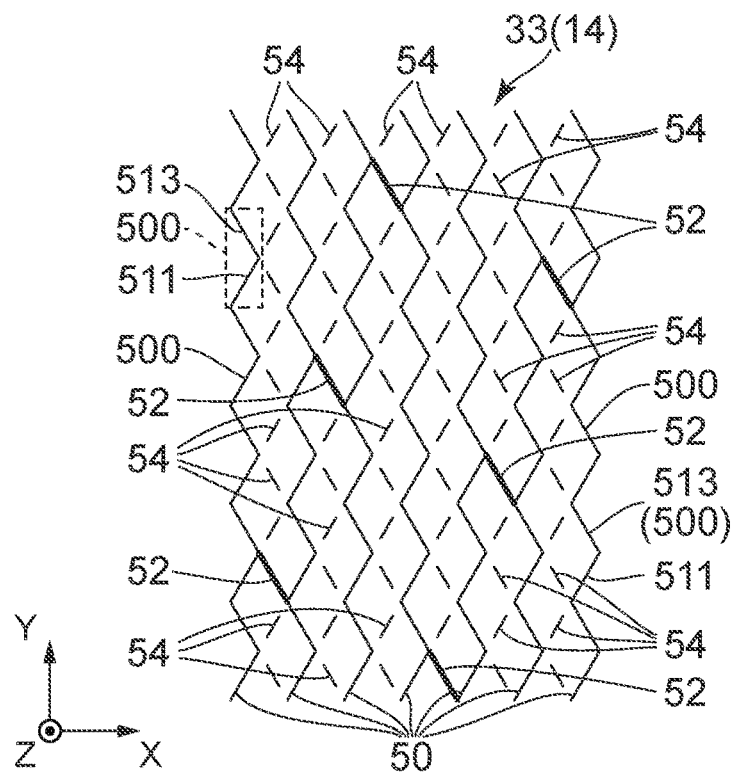
FIG. 11 is a diagram showing a third modification of the arrangement of the connection portions in the first electrode or the second electrode which are included in the conductive pattern of FIG. 3. The connection portions are emphasized.

Referring to FIG. 11, an arrangement of connection portions 52 is similar to that of the connection portions 52 of FIG. 10. Two groups of the connection portions 52 are different in position from each other in the second direction and in the first direction. The two groups of the connection portions 52 are different in position from each other in the first direction by a distance corresponding to one of the unit patterns 500.

Figure 12:
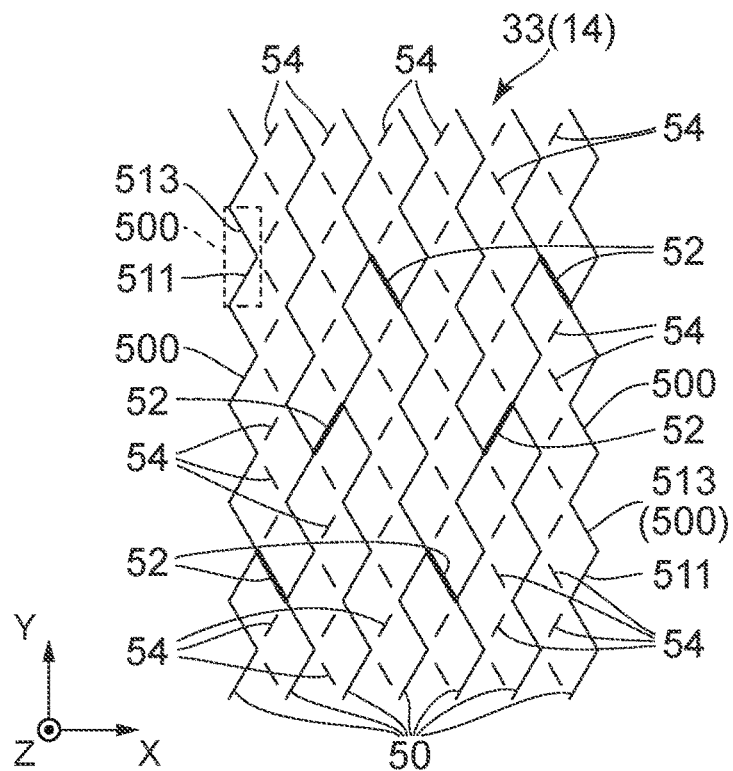
FIG. 12 is a diagram showing a fourth modification of the arrangement of the connection portions in the first electrode or the second electrode which are included in the conductive pattern of FIG. 3. The connection portions are emphasized.

Referring to FIG. 12, connection portions 52 are arranged so that only one of them is provided between the electrode main portions 50 adjacent to each other. Every three of the connection portions 52 forms a grope. In FIG. 12, two groups of the connection portions 52 are shown. The two groups are different in position from each other in the second direction. In each of the groups, the connection portions 52 closest to each other in the second direction extend in different directions. In detail, one of the connection portions 52 closest to each other in the second direction extends in the first diagonal direction, and the other extends in the second diagonal direction. Moreover, the connection portions 52 closest to each other in the second direction are apart from each other in the first direction by a distance corresponding to one of the unit patterns 500.

Figure 13:
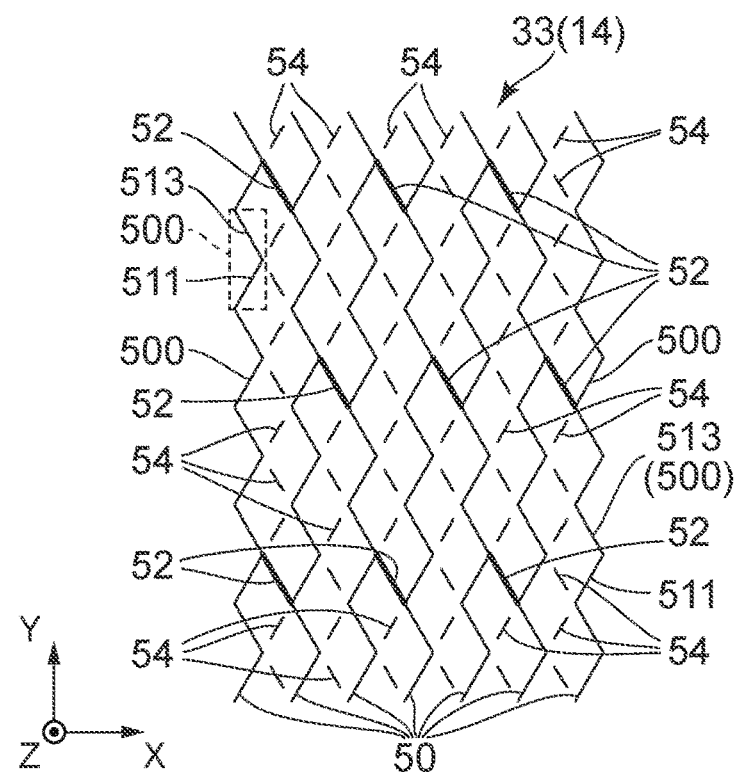
FIG. 13 is a diagram showing a fifth modification of the arrangement of the connection portions in the first electrode or the second electrode which are included in the conductive pattern of FIG. 3. The connection portions are emphasized.

Referring to FIG. 13, connection portions 52 are arranged so that one or two of them is provided between the electrode main portions 50 adjacent to each other. Every three of the connection portions 52 form a group. In FIG. 13, three groups of the connection portions 52 are shown. The three groups are different in position from one another in the second direction. Two of the connection portions 52 arranged in the first direction are different in position from each other in the first direction by a distance corresponding to four of the unit patterns 500. The connection portions 52 closest to each other in the second direction are different in position from each other in the first direction by a distance corresponding to two of the unit patterns 500. This arrangement of the connection portions 52 can reduce an electrical resistance in the second direction in comparison with a case where only one of the connection portions 52 is provided between the electrode main portions 50 adjacent to each other.

Figure 14:
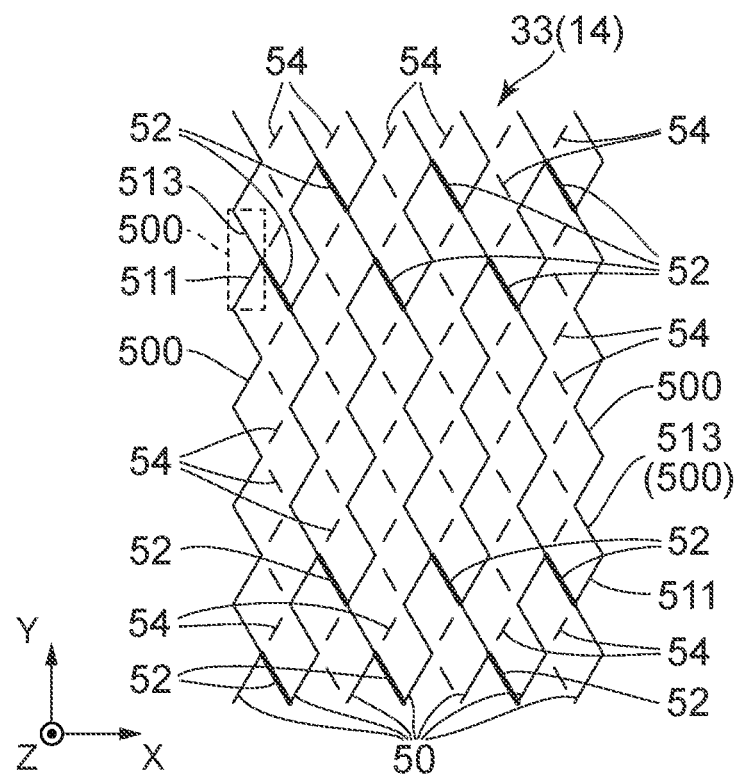
FIG. 14 is a diagram showing a sixth modification of the arrangement of the connection portions in the first electrode or the second electrode which are included in the conductive pattern of FIG. 3. The connection portions are emphasized.

Referring to FIG. 14, connection portions 52 are arranged so that two of them are provided every between the electrode main portions 50 adjacent to each other. Every four of the connection portions 52 forms a group. In FIG. 14, three groups are shown. The three groups are different in position from one another in the second direction. Two of the connection portions 52 arranged in the first direction are different in position from each other in the first direction by a distance corresponding to four of the unit patterns 500. The connection portions 52 closest to each other in the first direction and the second direction are different in position from each other in the first direction by a distance corresponding to one of the unit patterns 500. This arrangement of the connection portions 52 can further reduce an electrical resistance in the second direction in comparison with that of the connection portions 52 of FIG. 9. Moreover, this arrangement has redundancy for connection between the electrode main portions 50 adjacent to each other, and therefore it has high reliability.

Referring to FIG. 15, connection portions 52 are arranged so that two of them are provided every between the electrode main portions 50 adjacent to each other. Every six of the connection portions 52 forms a group. In FIG. 15, two groups of the connection portions 52 are shown. The two groups are different in position from each other in the second direction. In each of the groups, the connection portions 52 arranged in the first direction are different in position from each other in the first direction by a distance corresponding to three of the unit patterns 500. The connection portions 52 closest to each other in the first direction and the second direction are different in position from each other in the first direction by a distance corresponding to one of the unit patterns 500. The present embodiment also has redundancy for connection between the electrode main portions 50 adjacent to each other, and therefore it has high reliability.

At any rate, the number of the connection portions 52 and an arrangement of the connection portions 52 may be decided on the basis of relationship between a required electric resistance and required viewability. However, in order to improve the viewability, it is preferable that the number of the connection portions 52 is smaller. In the present invention, the electrode main portions 50 adjacent to each other are connected to each other by at least one of the connection portions 52. Under the condition, it is desirable that three of the unit patterns 500 which are continuous in each of the electrode main portions 50 is connected, by two or less of the connection portions 52, or not connected to one of the electrode main portions 50 which is adjacent thereto in the second direction. This is because of both of reducing the resistance and improving the viewability. In a case where each of the electrode main portions 50 is formed by two or less of the unit patterns 500, each of the electrode main portions 50 is connected to one of the electrode main portions 50 adjacent thereto in the second direction by one of the connection portions 52. In other words, in a case where two or more of the connection portions 52 are arranged in the first direction, each of the electrode main portions is formed by three or more of the unit patterns 500 which are continuous.

Figure 16:
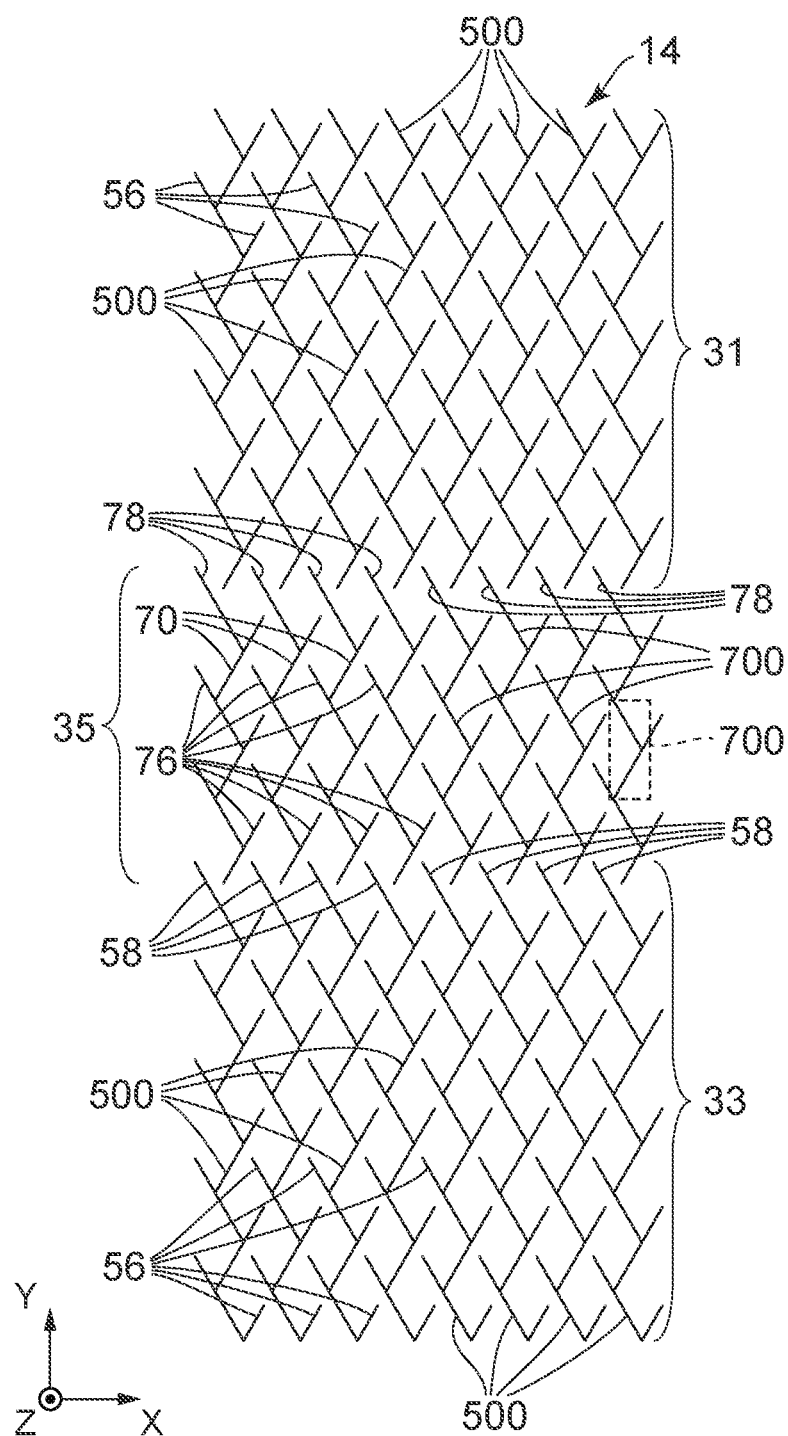
FIG. 16 is a diagram showing a first modification of the conductive pattern of FIG. 4. In each of the first electrode and the second electrode, connection portions are omitted.

As shown in FIG. 16, the dummy electrode 35 may have branch portions 76 in replace of short patterns 74. A pattern shape of the dummy electrode 35 is in common with that of the first electrode 31 and the second electrode 33. This is because of making the dummy electrode 35 inconspicuous from the first electrodes 31 and the second electrodes 33.

Figure 17:
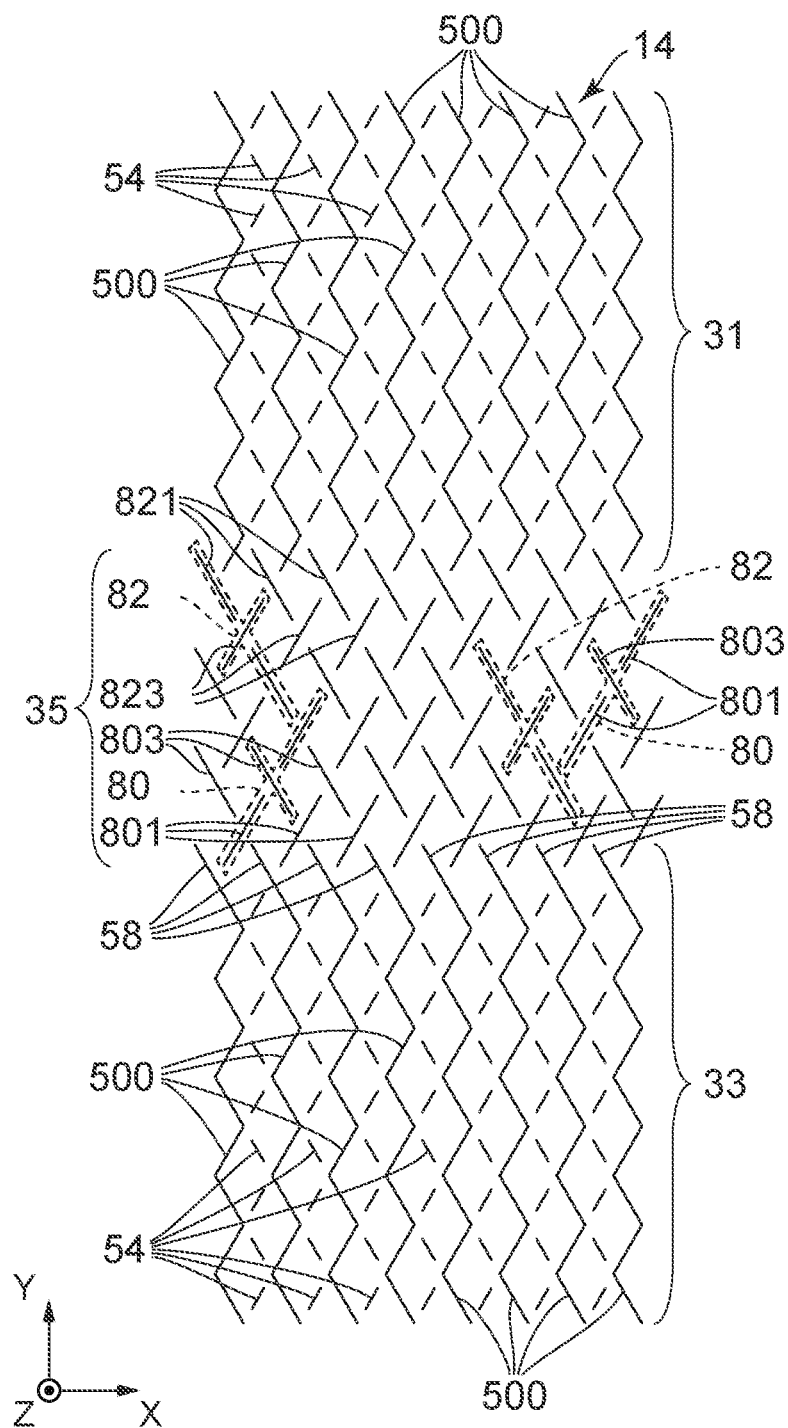
FIG. 17 is a diagram showing a second modification of the conductive pattern of FIG. 4.
Figure 18:
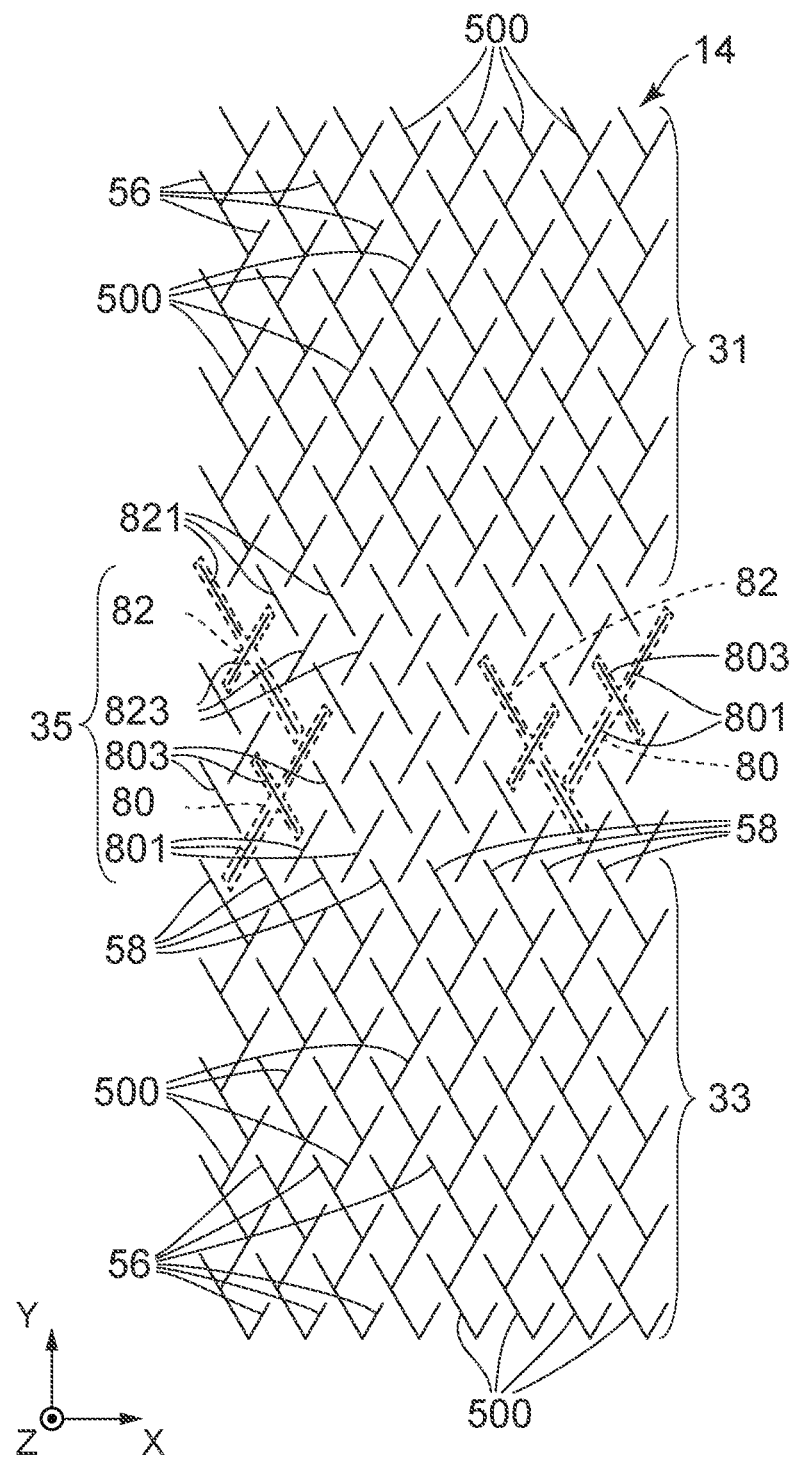
FIG. 18 is a diagram showing a third modification of the conductive pattern of FIG. 4.

As shown in FIG. 17 or 18, the dummy electrode 35 may be formed without using the unit dummy patterns 700. In detail, the dummy electrode 35 may have at least one of a first intersection portion 80 and a second intersection portion 82. The dummy electrode 35 shown in FIG. 17 or 18 has a plurality of the first intersection portions 80 and a plurality of the second intersection portions 82.

Referring to FIGS. 17 and 18, each of the first intersection portions 80 has two first separation wire portions 801 which are separated from each other in the first diagonal direction. Moreover, the first intersection portion 80 has a first intervention portion 803 extending in the second diagonal direction. The first intervention portion 803 intervenes between the first separation wire portions 801 in the first diagonal direction. The second intersection portion 82 has two second separation wire portions 821 which are separated from each other in the second diagonal direction. Moreover, the second intersection portion 82 has a second intervention portion 823 extending in the first diagonal direction. The second intervention portion 823 intervenes between the second separation wire portions 821 in the second diagonal direction. In the present modification, the first separation wire portions 801 also serve as the second intervention portions 823, and the first intervention portion 803 also serves as the second separation wire portion 821.

Figure 19:
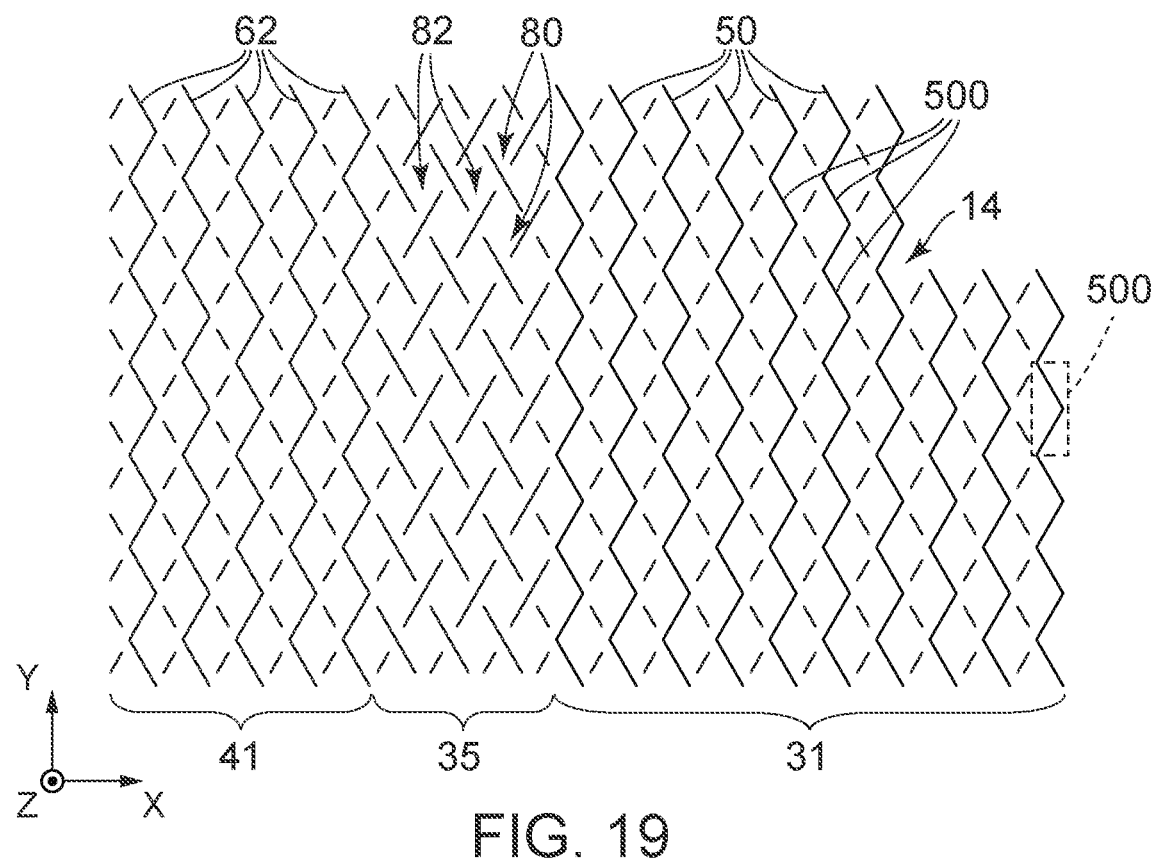
FIG. 19 is a diagram showing a modification of the conductive pattern of FIG. 5. The conductive pattern includes, in addition to a part of the outer peripheral ground wire and a part of the first electrode, a part of the dummy electrode which is located between the part of the outer peripheral ground wire and the part of the first electrode. In each of the first electrode and the outer peripheral ground wire, connection portions are omitted.

As shown in FIG. 19, the outer peripheral ground wire 41 may be formed by using at least one additional wire main portion 62 which has the same shape (or structure) as the wire main portion 60 (see FIG. 3). Moreover, between the outer peripheral ground wire 41 and the first electrode 31, a dummy electrode 35 may be formed. The dummy electrode 35 may be formed by using at least one of the first intersection portion 80 and the second intersection portion 82 according to a shape and a size of an area where the dummy electrode 35 is formed. Alternatively, the dummy electrode 35 may be formed by using the unit dummy patterns 700. When the outer peripheral ground wire 41 is formed by the additional wire main portion 62 as in the present modification, unlike a case where the outer peripheral ground wire 41 is the solid-pattern wire (see FIG. 5), it is unnecessary to hide the outer peripheral ground wire 41 with the outer cover or the like. Particularly, in a case where the dummy electrode 35 is formed between the outer peripheral ground wire 41 and the first electrode 31, it is unnecessary to hide the outer peripheral ground wire 41.

Figure 20:
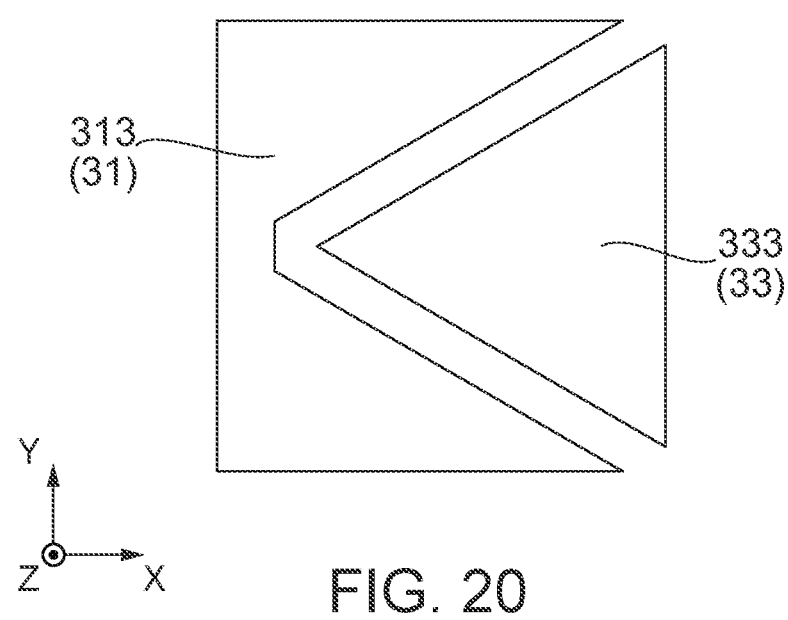
FIG. 20 is a plan view showing a first modification of the first electrode and the second electrode which are included in the electrode layer of the touch panel of FIG. 2. One of the second electrodes and a part of the first electrode corresponding thereto are shown.
Figure 21:
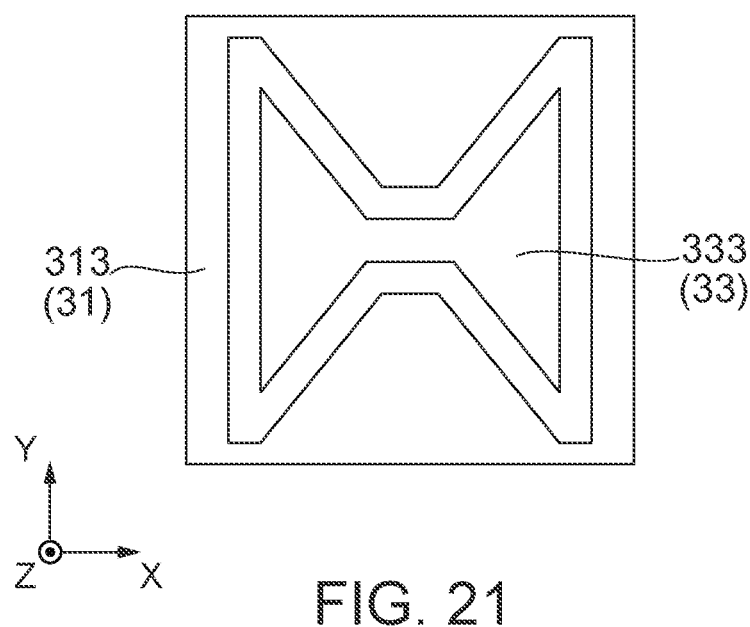
FIG. 21 is a plan view showing a second modification of the first electrode and the second electrode which are included in the electrode layer of the touch panel of FIG. 2. One of the second electrodes and a part of the first electrode corresponding thereto are shown.
Figure 22:
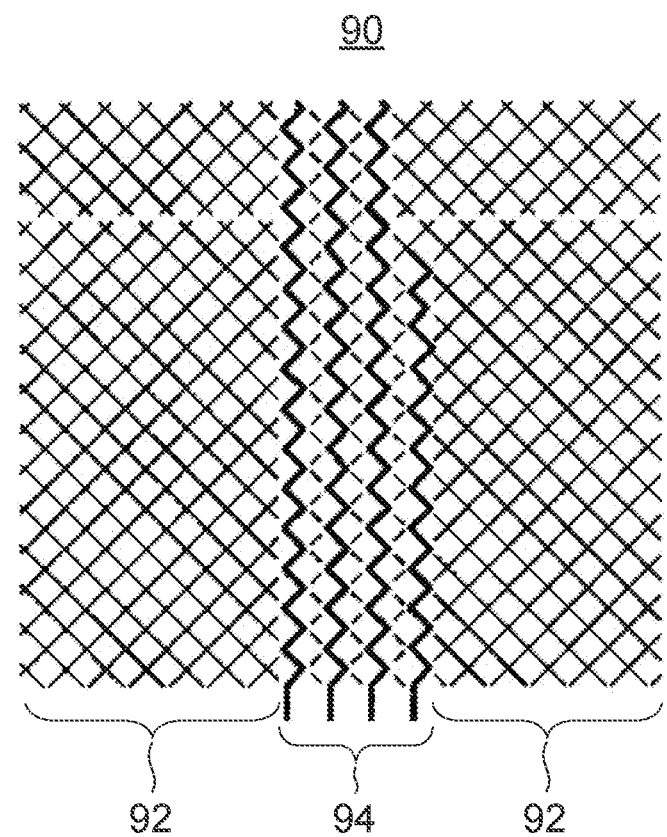
FIG. 22 is a diagram showing electrode pattern portions and wiring pattern portions of a touch switch device disclosed in Patent document 1.

As shown in FIGS. 20 and 21, the first electrode 31 and the second electrode 33 may have, respectively, a first facing portion 313 and a second facing portion 333 which have shapes different from rectangular shapes.

Referring to FIG. 20, the second facing portion 333 of the second electrode 33 is formed to have a triangle shape. The first facing portion 313 of the first electrode 31 has a shape corresponding to the shape of the second facing portion 333. In the present modification, a space exists between the first facing portion 313 and the second facing portion 333. In this space, a dummy electrode 35 may be formed.

As shown in FIG. 21, the second facing portion 333 of the second electrode 33 is formed to have a butterfly shape. The first facing portion 313 of the first electrode 31 has a shape corresponding to the shape of the second facing portion 333. The second facing portion 333 is surrounded by the first facing portion 313. In the present modification, a space exists between the first facing portion 313 and the second facing portion 333. In this space, a dummy electrode may be formed.

Each of the modifications mentioned above can further suppress the first electrode 31 and the second electrode 33 from being more conspicuous than the second lead-out wire 39. As a result, the viewability of the touch panel 10 is improved.

The present invention is based on a Japanese patent application of JP2019-209254 filed with the Japan Patent Office on Nov. 20, 2019, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10 Touch Panel
12 Base Member

14 Electrode Layer
16 Protective Layer
21 Detection Portion
210 Detection Row
23 Peripheral Portion
31 First Electrode
311 First Main Portion
313 First Facing Portion
33 The second electrodes (Sensor Electrode)
331 Second Main Portion
333 Second Facing Portion
35 Dummy Electrode
37 First Lead-Out Wire
39 Second Lead-Out Wire (Lead-Out Wire)
391 Elongation Portion
41 Outer Peripheral Ground Wire
50 Electrode Main Portion
500 Unit Pattern
511 First Portion
513 Second Portion
52 Connection Portion
54 Short Pattern
56 Branch Portion
58 Extension Portion
60 Wire Main Portion
600 Unit Pattern
611 First Portion
613 Second Portion
62 Additional Wire Main Portion
700 Unit Dummy Pattern
70 Dummy electrode main portion
74 Short Pattern
76 Branch Portion
78 Extension Portion
80 First Intersection Portion
801 First Separation Wire Portion
803 First Intervention Portion
82 Second Intersection Portion
821 Second Separation Wire Portion
823 Second Intervention Portion

The invention claimed is:

1. A touch panel comprising a detection portion which has sensor electrodes and a plurality of lead-out wires connected to the sensor electrodes, wherein:
the lead-out wires are electrically separated from one another;
each of the lead-out wires comprises a wire main portion;
the sensor electrode comprises a plurality of electrode main portions and a plurality of connection portions;
each of the wire main portions and the electrode main portions is formed by repeatedly arranging unit patterns in a first direction, each of the unit patterns having a predetermined shape;
two of the electrode main portions which are adjacent to each other in a second direction perpendicular to the first direction are connected to each other by at least one of the connection portions;
the connection portions which are closest to each other in the second direction are located in different positions in the first direction; and
when two or more of the connection portions are arranged in the first direction in each of the electrode main portions, three of the unit patterns which are continuous are connected, by two or less of the connection portions, or not connected to one of the electrode main portions which is adjacent to them in the second direction.

2. The touch panel as recited in claim 1, wherein when two or more of the connection portions are arranged in the first direction in each of the electrode main portions, the connection portions closest to each other in the first direction are apart from each other by a distance more than two of the unit patterns.

3. The touch panel as recited in claim 1 or 2, wherein the wire main portion, the electrode main portion and the connection portion have wiring widths which are equal to one another.

4. The touch panel as recited in claim 1, wherein:
the unit pattern comprises a first portion and a second portion;
the first portion extends in a first diagonal direction intersecting with both of the first direction and the second direction;
the second portion extends from one end of the first portion in a second diagonal direction intersecting with all of the first direction, the second direction and the first diagonal direction;
the touch panel further comprises a plurality of short patterns which are electrically independent of the wire main portions, the electrode main portions and the connection portions; and
each of the short patterns extends in either the first diagonal direction or the second diagonal direction.

5. The touch panel as recited in claim 1, wherein:
the unit pattern comprises a first portion and a second portion;
the first portion extends in a first diagonal direction intersecting with both of the first direction and a second direction;
the second portion extends from one end of the first portion in a second diagonal direction intersecting with all of the first direction, the second direction and the first diagonal direction;
each of the wire main portion and the electrode main portion further comprises a plurality of branch portions; and
each of the branch portions extends in either the first diagonal direction or the second diagonal direction.

6. The touch panel as recited in claim 4, wherein:
the touch panel further comprises a dummy electrode;
the dummy electrode comprises at least one dummy electrode main portion; and
the dummy electrode main portion is formed by using unit dummy patterns each of which has a shape same as the unit pattern.

7. The touch panel as recited in claim 4 or 5, wherein:
the touch panel further comprises a dummy electrode;
the dummy electrode has at least one of a first intersection portion and a second intersection portion;
the first intersection portion has two first separation wire portions separated from each other in the first diagonal direction and a first intervention portion extending in the second diagonal direction and intervening between the first separation wire portions in the first diagonal direction; and
the second intersection portion has two second separation wire portions separated from each other in the second diagonal direction and a second intervention portion extending in the first diagonal direction and intervening between the second separation wire portions in the second diagonal direction.

8. The touch panel as recited in claim 1, wherein:
the touch panel further comprises an outer peripheral ground wire;

the outer peripheral ground wire is provided around the detection portion; and the outer peripheral ground wire has an additional wire main portion having a structure same as the wire main portion.

9. The touch panel as recited in claim 5, wherein:

the touch panel further comprises a dummy electrode;

the dummy electrode comprises at least one dummy electrode main portion; and the dummy electrode main portion is formed by using unit dummy patterns each of which has a shape same as the unit pattern.

10. The touch panel as recited in claim 5, wherein:

the touch panel further comprises a dummy electrode;

the dummy electrode has at least one of a first intersection portion and a second intersection portion;

the first intersection portion has two first separation wire portions separated from each other in the first diagonal direction and a first intervention portion extending in the second diagonal direction and intervening between the first separation wire portions in the first diagonal direction; and the second intersection portion has two second separation wire portions separated from each other in the second diagonal direction and a second intervention portion extending in the first diagonal direction and intervening between the second separation wire portions in the second diagonal direction.

\* \* \* \* \*

UNITED STATES PATENT AND TRADEMARK OFFICE
CERTIFICATE OF CORRECTION

PATENT NO. : 12,014,017 B2
APPLICATION NO. : 17/766695
DATED : June 18, 2024
INVENTOR(S) : Yuji Kitamura et al.

Page 1 of 1

It is certified that error appears in the above-identified patent and that said Letters Patent is hereby corrected as shown below:

In the Claims

In Column 14, Line 7 (Line 1 of Claim 3), please change: "claim 1 or 2" to correctly read: --claim 1--, In Column 14, Line 49 (Line 1 of Claim 7), please change: "claim 4 or 5" to correctly read: --claim 4--.

Signed and Sealed this
Twenty-fourth Day of September, 2024

Katherine Kelly Vidal
*Director of the United States Patent and Trademark Office*